(12) United States Patent
Hieda (10) Patent No.: US 11,571,666 B2
(45) Date of Patent: Feb. 7, 2023

(54) BASE MATERIAL, FOR MEMBRANE FILTER AND METHOD FOR PRODUCING SAME

(71) Applicant: NGK INSULATORS, LTD., Nagoya (JP)

(72) Inventor: Koji Hieda, Toki (JP)

(73) Assignee: NGK Insulators, Ltd., Nagoya (JP)

( * ) Notice: Subject to any disclaimer, the term of this patent is extended or adjusted under 35 U.S.C. 154(b) by 77 days.

(21) Appl. No.: 16/990,183

(22) Filed: Aug. 11, 2020

(65) Prior Publication Data

US 2020/0368695 A1 Nov. 26, 2020

Related U.S. Application Data

(63) Continuation of application No. PCT/JP2019/012458, filed on Mar. 25, 2019.

(30) Foreign Application Priority Data

Mar. 30, 2018 (JP) .............................. JP2018-067361

(51) Int. Cl.
*B01D 71/02* (2006.01)
*B01D 67/00* (2006.01)
*B01D 69/04* (2006.01)

(52) U.S. Cl.
CPC ....... *B01D 71/025* (2013.01); *B01D 67/0083* (2013.01); *B01D 69/043* (2013.01); *B01D 2323/08* (2013.01); *B01D 2325/02* (2013.01)

(58) Field of Classification Search
None
See application file for complete search history.

(56) References Cited

U.S. PATENT DOCUMENTS

| | | | |
|---|---|---|---|
| 5,415,775 A | 5/1995 | Castillon et al. | |
| 2006/0292393 A1* | 12/2006 | Kunieda | B01J 35/04 428/688 |
| 2010/0243557 A1* | 9/2010 | Tomita | B01D 71/025 210/490 |

(Continued)

FOREIGN PATENT DOCUMENTS

| | | |
|---|---|---|
| EP | 2 236 197 A1 | 10/2010 |
| EP | 2 918 331 A1 | 9/2015 |

(Continued)

OTHER PUBLICATIONS

Yong Hong Wang et al., Microstructure control of ceramic membrane support from corundum-rutile powder mixture, Powder Technology, vol. 168, Issue 3, 2006, pp. 125-133 (Year: 2006).*

(Continued)

*Primary Examiner* — Jason M Greene
*Assistant Examiner* — Eric J McCullough
(74) *Attorney, Agent, or Firm* — Burr & Brown, PLLC (57) ABSTRACT

A base material for a membrane filter contains 90% by mass or more of aluminum oxide and 0.1% by mass or more and 10% by mass or less of titanium oxide. In a pore distribution curve measured by a mercury porosimeter, the base material has a first peak and a second peak which is higher than the first peak and is located at a pore size larger than that of the first peak, and the volume of pores with a pore size of 7 μm or more is 0.02 cm³/g or more.

9 Claims, 3 Drawing Sheets

(56) References Cited

U.S. PATENT DOCUMENTS

| | | |
|---|---|---|
| 2010/0300960 A1 | 12/2010 | Hishiki et al. |
| 2015/0008177 A1 | 1/2015 | Yajima et al. |
| 2015/0008180 A1* | 1/2015 | Uchikawa ............ C04B 38/0019 |
| | | 210/500.26 |
| 2015/0258508 A1 | 9/2015 | Lopetegui Garnica et al. |

FOREIGN PATENT DOCUMENTS

| | | |
|---|---|---|
| JP | H06-172057 A1 | 6/1994 |
| JP | 2009-255035 A1 | 11/2009 |
| JP | 2010-228948 A1 | 10/2010 |
| WO | 2013/147271 A1 | 10/2013 |

OTHER PUBLICATIONS

English translation of International Preliminary Report on Patentability (Chapter 1) (Application No. PCT/JP2019/012458) dated Oct. 15, 2020, 6 pages.

International Search Report and Written Opinion (Application No. PCT/JP2019/012458) dated Apr. 23, 2019.

Extended European Search Report, European Application No. 19774873.4, dated Nov. 25, 2021 (9 pages).

Wang, Y.H. et al., "Microstructure control of ceramic membrane support from corundum-rutile powder mixture," *Powder Technology, Elsevier*, Basel (CH), vol. 168, No. 3, dated Oct. 18, 2006, pp. 125-133, XP027983857, ISSN: 0032-5910 (9 pages).

* cited by examiner

BASE MATERIAL, FOR MEMBRANE FILTER AND METHOD FOR PRODUCING SAME

BACKGROUND OF THE INVENTION

1. Field of the Invention

The present disclosure disclosed herein relates to a base material for a membrane filter and a method for producing the same.

2. Description of the Related Art

As a ceramic membrane filter, there has been proposed one including a porous base material which is a microfiltration membrane (MF membrane), a titania UF membrane which is an ultrafiltration membrane (UF membrane) formed on the porous base material and has an average pore size of 2 to 20 nm and a thickness of 0.1 to 1.0 WE, and a ceramic membrane which is a ceramic porous membrane formed on the titania UF membrane and part of which has penetrated into pores of the titania UF membrane or into pores of the titania UF membrane and the porous base material (for example, refer to Patent Literature 1). According to this ceramic membrane filter, it is possible to provide a ceramic filter including a ceramic porous membrane having few defects, a small and uniform thickness, and high resolution.

CITATION LIST

Patent Literature

PTL 1: Japanese Unexamined Patent Application Publication No. 2009-255035

SUMMARY OF THE INVENTION

After performing separation treatment on various objects to be separated, such a ceramic membrane filter in some cases may be cleaned with a chemical agent, such as an acid or alkali. Therefore, the ceramic membrane filter is required to have not only resistance to an object to be separated, but also resistance to a chemical agent, such as an acid or alkali. In order to obtain a highly corrosion-resistant ceramic base material, for example, high-temperature sintering at about 2,000° C. in a hydrogen reduction atmosphere is required, and thus, it is not easy to produce such a ceramic base material. It has been desired to enhance separation performance, strength, and corrosion resistance.

The present disclosure has been made in view of the problems described above, and a main object of the disclosure is to provide a base material for a membrane filter which can enhance separation performance, strength, and corrosion resistance, and a method for producing a base material for a membrane filter.

In order to achieve the main object described above, the present inventors have conducted thorough studies and found that by mixing alumina and titania, each having a specific average particle size and a specific purity, at specific composition ratios, even when firing is performed in an oxidizing atmosphere, separation characteristics do not deteriorate, and strength and corrosion resistance can be further improved, thus leading to completion of the present invention.

That is, a base material for a membrane filter disclosed in this description contains 90% by mass or more of aluminum oxide and 0.1% by mass or more and 10% by mass or less of titanium oxide, in which in a pore distribution curve measured by a mercury porosimeter, the base material has a first peak and a second peak which is higher than the first peak and is located at a pore size larger than that of the first peak; and the volume of pores with a pore size of 7 μm or more is 0.02 $cm^3$/g or more.

A method for producing a base material for a membrane filter disclosed in this description includes a mixing and forming step in which, using, as raw materials, aluminum oxide having an average particle size of 35 μm or more and 45 μm or less and a purity of 90% by mass or more and titanium oxide having an average particle size of 0.01 μm or more and 1 μm or less and a purity of 70% by mass or more, mixing is performed such that the amount of aluminum oxide is 90% by mass or more and the amount of titanium oxide is 0.1% by mass or more and 10% by mass or less based on the total of aluminum oxide and titanium oxide, and the resulting mixture is formed into a shaped body; and a firing step in which the shaped body is fired in an oxidizing atmosphere in a temperature range of 1,400° C. to 1,600° C.

In the base material for a membrane filter and the method for producing the same, separation performance, strength, and corrosion resistance can be enhanced. The reason for this is surmised to be as follows. For example, in a membrane filter, in order to secure filtration capacity, a base material serving as a membrane support is required to have higher fluid permeability (e.g., permeation rate). Since the fluid permeability depends on the pore size and porosity, the base material serving as a support is desired to have larger pores with a high porosity while maintaining its strength. In order to form larger pores, it is necessary to use larger raw material particles, and it becomes difficult to sinter such raw material particles as the particle size increases. For example, in order to sinter an alumina raw material having a large particle size with an average particle size of 35 μm or more, high temperature exceeding 1,600° C. is required. However, since there is no furnace material which can withstand an oxidizing atmosphere, firing in a hydrogen reduction atmosphere is required. Furthermore, when the base material is subjected to high-temperature firing in a hydrogen reduction atmosphere, the pore size increases, and fluid permeability can be increased. However, such firing incurs high cost and is not easy to perform. In a base material for a membrane filter and a method for producing the same according to the present disclosure, by adding titanium oxide having a specific average particle size and a specific purity in an amount in a specific range to an aluminum oxide raw material having a specific average particle size and a specific purity, even in an oxidizing atmosphere and at a lower firing temperature, aluminum oxide can be sintered in a state of having a relatively large pore size. Accordingly, the base material for a membrane filter has better mechanical strength and better pore distribution, and thus separation performance can be enhanced. Furthermore, an aluminum oxide raw material is used, and the addition amount of titanium oxide serving as a sintering aid is relatively small. Therefore, corrosion resistance can be enhanced.

DETAILED DESCRIPTION OF THE INVENTION

Figure 1:
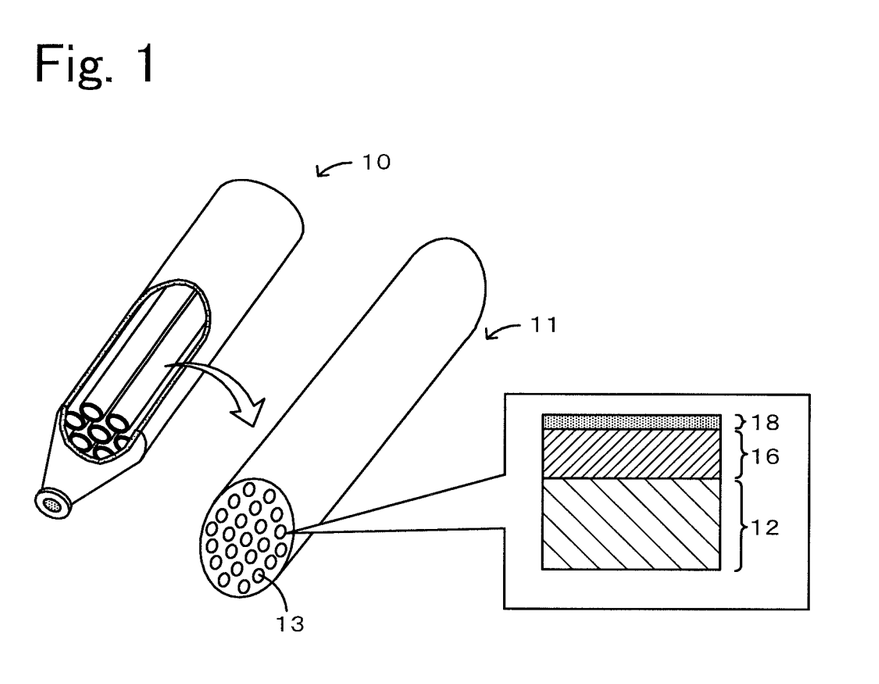
FIG. 1 is a diagram showing an example of a membrane filter 11 used in a separation apparatus 10.

Next, an embodiment of the present invention will be described with reference to the drawings. FIG. 1 is a diagram showing an example of a membrane filter 11 used in a separation apparatus 10 which is described in this embodiment. The separation apparatus 10 is equipped with a plurality of membrane filters 11 and is configured to separate a fluid to be treated containing an object to be separated. The membrane filter 11 includes a porous base material 12 which is a base material for a membrane filter, an intermediate membrane 16 formed on the base material 12, and a separation membrane 18 formed on the intermediate membrane 16. The membrane filter 11 can be used, for example, for gas separation and water separation. For example, the membrane filter 11 is used in the applications of liquid-waste treatment for ingot processing effluent, active pharmaceutical ingredient processes, such as enzymes and antibiotics, and beverage and food processes, such as mineral water and soy sauce. The membrane filter 11 has high corrosion resistance to chemical cleaning and the like.

The separation membrane 18 is a membrane which is formed on the intermediate membrane 16 and selectively allows an object to be separated from a fluid to be treated to pass therethrough. The separation membrane 18 may have an average thickness in a range of 5 μm to 20 μm. As the main material constituting the separation membrane 18, for example, one or more ceramics selected from alumina, titania, silica, cordierite, zirconia, and mullite may be used. Such a separation membrane 18 can have excellent heat resistance, chemical resistance, impact resistance, and the like. Furthermore, the separation membrane 18 may be a zeolite membrane containing zeolite. Examples of zeolite include LTA (type A), MFI (ZSM-5, silicalite), MOR (mordenite), AFI (SSZ-24), FER (ferrierite), FAU (type X, type T), and DDR (deca-dodecasil-3R). Alternatively, the separation membrane 18 may be an organic-inorganic composite membrane in which organic and inorganic skeletons are combined together.

The intermediate membrane 16 is a membrane which functions as an underlayer to the separation membrane 18. The intermediate membrane 16 may be, for example, a support layer consisting of a single layer, not multiple layers, with a thickness of 100 μm or more. The intermediate membrane 16 may have an average thickness of 120 μm or more and 450 μm or less. Note that the thickness of each of the intermediate membrane 16 and the separation membrane 18 is measured by cutting the filter in the cell formation direction and observing with an electron microscope (SEM, STEM, or TEM). Preferably, the intermediate membrane 16 has an average pore size in a range of 0.1 μm to 0.6 μm. As the main material constituting the intermediate membrane 16, one or more ceramics selected from alumina, titania, silica, cordierite, zirconia, and mullite may be used. Such an intermediate membrane 16 can have excellent heat resistance, chemical resistance, impact resistance, and the like. Note that, in the membrane filter 11, the intermediate membrane 16 may be omitted.

The base material 12 has a plurality of cells 13 formed therein, the cells 13 serving as passages for a fluid to be separated. In the membrane filter 11, out of a fluid to be treated introduced into the cell 13 from the inlet side of the cell 13, a portion of the fluid having a molecular size that can pass through the separation membrane 18 passes through the separation membrane 18, the intermediate membrane 16, and the base material 12 and is discharged as a permeate fluid from the side face of the membrane filter 11. On the other hand, a non-permeate fluid that cannot pass through the separation membrane 18 flows along the passage of the cell 13 and is discharged from the outlet side of the cell 13. The base material 12 may have a monolith structure provided with a plurality of cells 13 or may have a tubular structure provided with one cell. Its external shape is not particularly limited, but can be cylindrical, elliptic cylindrical, quadrangular prismatic, hexagonal prismatic, or the like. Alternatively, the base material 12 may be formed into a tubular shape with a polygonal cross section.

The base material 12 may have a single-layer structure or a multilayer structure. The base material 12, for example, may be configured to include a fine grain portion on a surface of which the intermediate membrane 16 is formed and a coarse grain portion on a surface of which the fine grain portion is formed. The base material 12 may be a member having a larger pore size than the intermediate membrane 16 and may be a member having a higher porosity than the intermediate membrane 16. Furthermore, the base material 12 may be a member obtained, for example, by extrusion or the like. As the main material constituting the base material 12, aluminum oxide (α-alumina, γ-alumina, anodized alumina, or the like) is preferable, and titanium oxide (titania) may be incorporated therein. The base material 12 contains 90% by mass or more of aluminum oxide and 0.1% by mass or more and 10% by mass or less of titanium oxide. The base material 12 contains preferably 95% by mass or more, and more preferably 98% by mass or more, of aluminum oxide. The base material 12 contains preferably 0.5% by mass or more and 5% by mass or less, and more preferably 1% by mass or more and 2% by mass or less, of titanium oxide. In such ranges, it is possible to enhance mechanical strength and corrosion resistance.

The base material 12, for example, may have an average pore size of about 6 μm to 8 μm. Furthermore, the base material 12 may have a porosity of 30% by volume or more and 35% by volume or less. In the base material 12, the average particle size of the constituent aluminum oxide may be in a range of 35 μm to 45 μm.

In a pore distribution curve measured by a mercury porosimeter, the base material 12 has a first peak and a second peak which is higher than the first peak and is located at a pore size larger than that of the first peak, and the volume of pores with a pore size of 7 μm or more is 0.02 cm³/g or more. For example, when aluminum oxide and titanium oxide, each having a predetermined average particle size and a predetermined purity, are mixed at a predetermined ratio and fired in an oxidizing atmosphere in accordance with the production method which will be described later, a pore structure having a first peak and a second peak is obtained. Furthermore, improvement in fluid permeability (permeation rate) requires the existence of a volume of pores with a relatively large pore size. In the base material 12, the volume of pores with a pore size of 7 μm or more is 0.02 cm³/g or more, thus exhibiting higher fluid permeability (e.g., water permeability). In the pore distribution curve measured by the mercury porosimeter, preferably, the base material 12 has the first peak located at a pore size in a range of 4 μm to 6 μm and the second peak located at a pore size in a range of 6 μm to 9 μm. When the first peak and the second peak are located in these ranges, fluid permeability can be enhanced. Furthermore, the first peak may be located at a pore size in a range of 4 μm to 5 μm, and the second peak may be located at a pore size in a range of 7 μm to 8 μm. Furthermore, in the base material 12, in the pore distribution curve measured by the mercury porosimeter, the volume of pores of the first peak may be in a range of 0.005 cm$^3$/g to 0.02 cm$^3$/g, and the volume of pores of the second peak may be in a range of 0.03 cm$^3$/g to 0.05 cm$^3$/g. When the first peak and the second peak are in these ranges, fluid permeability can be enhanced.

Preferably, the base material 12 has a permeation rate of 7.5 m$^3$/(m$^2$·h) or more. When the permeation rate is within this range, the separation performance of the fluid to be treated can be enhanced. The permeation rate of the base material 12 is more preferably 8.0 m$^3$/(m$^2$·h) or more, and still more preferably 8.5 m$^3$/(m$^2$·h) or more. The permeation rate of the base material 12 is preferably as high as possible, but may be 12.0 m$^3$/(m$^2$·h) or less. The permeation rate is measured as follows. First, a sealing portion is arranged on the outlet side of the base material 12 so as to obtain a state in which one side of the cell 13 is sealed, and by feeding distilled water from the inlet side into the cell 13, the flow rate, pressure, and water temperature of the feed water are measured. The measured values are converted to 25° C. under the pressing conditions of 0.1 MPa, and the volume of water which has passed through the base material per unit time and unit area is measured and defined as the permeation rate (m$^3$/(m$^2$·h)).

Figure 2:
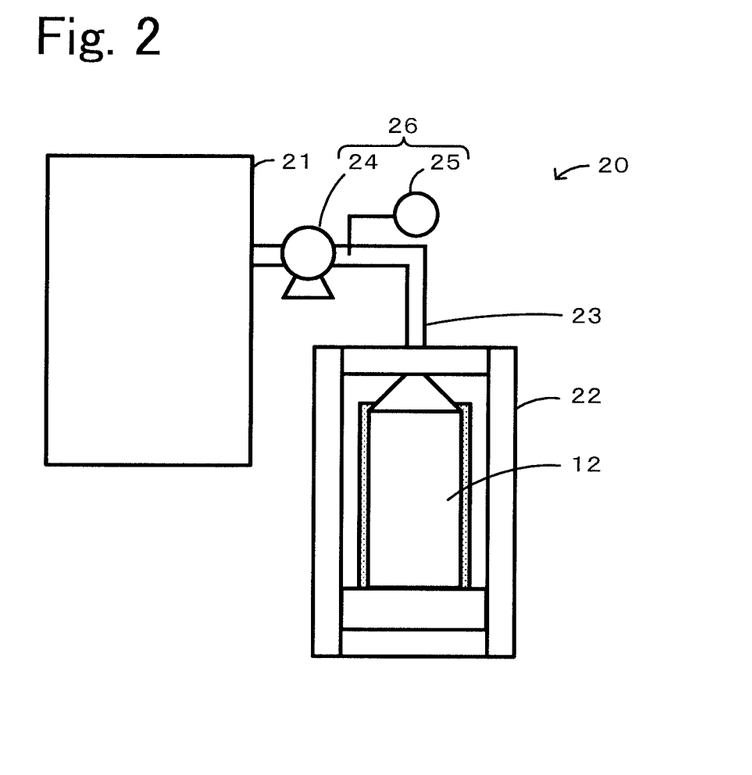
FIG. 2 is a diagram showing an example of an internal pressure strength measurement device 20.

Preferably, the base material 12 has an internal pressure strength of 0.6 MPa or more. When the internal pressure strength is within this range, reliability in separation treatment is high, which is preferable. The internal pressure strength of the base material 12 is more preferably 0.8 MPa or more, and still more preferably 1.0 MPa or more. The internal pressure strength of the base material 12 is preferably as high as possible, but may be 1.5 MPa or less. Preferably, the base material 12 has higher corrosion resistance. The corrosion resistance can be, for example, evaluated by internal pressure strength (MPa) after a corrosion test. Preferably, the base material 12 has an internal pressure strength of 0.5 MPa or more after the corrosion test. When the internal pressure strength after the corrosion test is within this range, separation treatment and cleaning can be repeated for a considerable number of times. The internal pressure strength after the corrosion test of the base material 12 is preferably 0.6 MPa or more, and more preferably 0.8 MPa or more. The internal pressure strength of the base material 12 is preferably as high as possible, but may be 1.5 MPa or less. The internal pressure strength is measured by using an internal pressure strength measurement device under the condition where water pressure is applied to a product. FIG. 2 is a diagram showing an example of an internal pressure strength measurement device 20 which measures the internal pressure strength of the base material 12. The internal pressure strength measurement device 20 includes a tank 21 which accommodates water, a mounting unit 22 which mounts and fixes a base material 12, a pipe 23 which sends a liquid from the tank 21 to the mounting unit 22, and a water pressure test pump 26 (manual type) having a pressure portion 24 and a pressure gauge 25. In the measurement of the internal pressure strength, by applying a latex to end faces of the base material 12 and inner faces of cells, water for measurement is prevented from leaking from the end faces and the side face of the base material, and cells at the end face opposite to the end face into which water is introduced. Furthermore, the base material 12 is fixed on the mounting unit 22 in the state in which one end face side of the base material 12 is blocked (in the dead-end state). The internal pressure strength is defined as a pressure at which the base material 12 is broken when water pressure is applied to the inside of the base material 12 by the water pressure test pump 26. Furthermore, in the corrosion test, the base material is immersed in sulfuric acid (pH=1.3) and treated in an autoclave container at 200° C. for 3 hours, then washed with water, immersed in a NaOH solution (pH=13), and treated in an autoclave container at 200° C. for 3 hours. This cycle is performed twice.

The base material 12 is not particularly limited, but may have a cylindrical external shape and a plurality of cells 13 with a circular cross section formed therein. For example, the base material 12 may have a shape with a diameter of 30 mm or more, a length of 100 mm or more, and 19 or more cells. Furthermore, the base material 12 may have a shape with a diameter of 90 mm or more, a length of 100 mm or more, and 300 or more cells. Alternatively, the base material 12 may have a shape with a diameter of 180 mm or more, a length of 500 mm or more, and 2,000 or more cells. The shape of the base material 12 may be appropriately selected depending on the intended use.

Next, a method for producing a base material used for the membrane filter 11 will be described below. A method for producing a base material for a ceramic membrane filter may, for example, include a mixing and forming step in which raw material powders are mixed and formed into a shaped body, and a firing step in which the shaped body is fired. Note that a method for producing the membrane filter 11 may include, in addition to the base material production steps, an intermediate membrane formation step in which an intermediate membrane is formed on the base material, and a separation membrane formation step in which a separation membrane is formed on the intermediate membrane. The description of the intermediate membrane formation step and the separation membrane formation step will be omitted here.

(Mixing and Forming Step)

In this step, a mixing process of mixing raw materials and a forming process of forming mixed raw material powders are performed. In the mixing process, aluminum oxide and titanium oxide, serving as raw materials, are mixed. The raw material powders are mixed such that the amount of aluminum oxide is 90% by mass or more and the amount of titanium oxide is 0.1% by mass or more and 10% by mass or less based on the total of aluminum oxide and titanium oxide. In such ranges, mechanical strength and corrosion resistance can be enhanced. The mixing amount of the aluminum oxide raw material is preferably 95% by mass or more, more preferably 98% by mass or more, and preferably 99.9% by mass or less. Furthermore, the mixing amount of the titanium oxide raw material may be 1% by mass or more and 2% by mass or less.

In the mixing process, aluminum oxide that has an average particle size of 35 μm or more and 45 μm or less is used. When the average particle size is within this range, fluid permeability can be enhanced. Preferably, the average particle size of aluminum oxide is 37 μm or more and 43 μm or less. For example, by mixing aluminum oxide powders with an average particle size of 0.5 μm or more and 50 μm or less, the average particle size of aluminum oxide may be adjusted to a range of 35 μm to 45 μm. Furthermore, the aluminum oxide raw material may be obtained by appropriately formulating alumina powders with an average particle size of 50 μm, 30 μm, 10 μm, and 0.5 μm such that the average particle size becomes a predetermined value within the range described above. In this case, the formulation of aluminum powders may be appropriately adjusted such that a pore distribution curve measured by a mercury porosimeter after firing is within the range described above. The aluminum oxide raw material has a purity of 90% by mass or more. When the purity is within this range, mechanical strength can be enhanced, and corrosion resistance can be enhanced. The purity of the aluminum oxide raw material is preferably as high as possible, preferably 95% by mass or more, more preferably 98% by mass or more, and still more preferably 99% by mass or more. The purity of the aluminum oxide raw material may be 99.9% by mass or less. Examples of impurities contained in aluminum oxide include oxides of Fe, Al, Si, Nb, and Na.

In the mixing process, titanium oxide that has an average particle size of 0.01 µm or more and 1 µm or less is used. When the average particle size is within this range, the average particle size is appropriate for a sintering aid, and the mechanical strength of the base material can be enhanced. The titanium oxide raw material has a purity of 70% by mass or more. When the purity is within this range, mechanical strength can be enhanced, and corrosion resistance can be enhanced. The purity of the titanium oxide raw material is preferably as high as possible, preferably 85% by mass or more, more preferably 90% by mass or more, and still more preferably 99% by mass or more. The purity of the titanium oxide raw material may be 99.9% by mass or less.

In the forming process, the raw material powders are formed into a puddle, which may be, for example, formed by extrusion into a filter shape or the like. As the filter shape, for example, a shaped body may have a cylindrical external shape and a plurality of cells 13 with a circular cross section formed therein (refer to FIG. 1). For example, in the forming process, as the base material, a shaped body with a diameter of 30 mm or more, a length of 100 mm or more, and 19 or more cells may be formed. Furthermore, as the base material, a shaped body with a diameter of 90 mm or more, a length of 100 mm or more, and 300 or more cells may be formed. Alternatively, as the base material, a shaped body with a diameter of 180 mm or more, a length of 500 mm or more, and 2,000 or more cells may be formed. The forming of the base material may be appropriately selected depending on the intended use.

(Firing Step)

In this step, the shaped body thus formed is fired in an oxidizing atmosphere in a temperature range of 1,400° C. to 1,600° C. When the raw material powders having the average particle sizes, purities, and composition ratios described above are used, by performing firing under these firing conditions, it is possible to obtain a base material having enhanced fluid permeability, mechanical strength, and corrosion resistance. As the oxidizing atmosphere, for example, firing is preferably performed in the air. Furthermore, from the viewpoint of energy consumption, the firing temperature is preferably lower, and may be 1,500° C. or lower. On the other hand, from the viewpoint of mechanical strength, the firing temperature is preferably higher, and may be 1,500° C. or higher. The firing time may be set, for example, in a range of 1 to 24 hours.

In the base material for a membrane filter and the method for producing the same according to the embodiment described above, separation performance, strength, and corrosion resistance can be enhanced. The reason for this is surmised to be as follows. For example, in a membrane filter, in order to secure filtration capacity, a base material serving as a membrane support is required to have higher fluid permeability (e.g., permeation rate). Since the fluid permeability depends on the pore size and porosity, the base material serving as a support is desired to have larger pores with a high porosity while maintaining its strength. In order to form larger pores, it is necessary to use larger raw material particles, and it becomes difficult to sinter such raw material particles as the particle size increases. For example, in order to sinter an alumina raw material having a large particle size with an average particle size of 35 µm or more, high temperature exceeding 1,600° C. is required. However, since there is no furnace material which can withstand an oxidizing atmosphere, firing in a hydrogen reduction atmosphere is required. Furthermore, when the base material is subjected to high-temperature firing in a hydrogen reduction atmosphere, the pore size increases, and fluid permeability can be increased. However, such firing incurs high cost and is not easy to perform. In the base material for a membrane filter and a method for producing the same, by adding titanium oxide having a specific average particle size and a specific purity in an amount in a specific range to an aluminum oxide raw material having a specific average particle size and a specific purity, even in an oxidizing atmosphere and at a lower firing temperature, aluminum oxide can be sintered in a state of having a relatively large pore size. Accordingly, the base material for a membrane filter has better mechanical strength and better pore distribution, and thus separation performance can be enhanced. Furthermore, an aluminum oxide raw material is used, and the addition amount of titanium oxide serving as a sintering aid is relatively small. Therefore, corrosion resistance can be enhanced.

It is to be understood that the present disclosure is not limited to the embodiment described above, and various embodiments are possible within the technical scope of the present disclosure.

For example, in the embodiment described above, the membrane filter 11 as a whole has been described. However, the base material 12, which is a constituent member of the membrane filter 11, without the separation membrane 18 and the intermediate membrane 16 may be described independently.

EXAMPLES

In each of Experimental Examples described below, a base material for a membrane filter was specifically produced. Note that Experimental Examples 3-7, 12-13, 16-17, 20-23, 26-28, and 31-32 correspond to examples, and Experimental Examples 1-2, 8-11, 14-15, 18-19, 24-25, and 29-30 correspond to comparative examples.

Experimental Example 1

Alumina having an average particle size of 26 µm and a purity of 99% by mass and titania having an average particle size of 0.2 µm and a purity of 99% by mass or more were used as raw materials. Mixing was performed such that the amount of alumina was 99% by mass and the amount of titania was 1% by mass based on the total of alumina and titania. The alumina raw material powder was obtained by appropriately formulating alumina powders with an average particle size of 50 µm, 30 µm, 10 µm, and 0.5 µm such that the average particle size became the value described above. The raw material powders and 5 parts by mass of methylcellulose serving as a binder, 1 part by mass of a grease lubricant, and 35 parts by mass of water added thereto were kneaded. Using a vacuum pug mill, an intermediate shaped body of degassed clay with a diameter of 250 mm and a length of 1,000 mm was formed. Subsequently, using a hydraulic plunger forming machine equipped with a mouthpiece at an end, the intermediate shaped body was formed by extrusion into a cylindrical base material with a diameter of 180 mm, a length of 1,000 mm, and 2,000 cells. The resulting shaped body was fired in an oxidizing atmosphere at 1,500° C. for 2 hours to obtain a base material for a membrane filter. The base material had an average pore size of 4 μm and a porosity of 30% by volume. Note that the average particle sizes of alumina powders before formulation was measured by a laser diffraction particle size analyzer (LA-920 manufactured by HORIBA, Ltd.), and the average particle size of the alumina raw material after formulation was calculated from the average particle sizes of the powders before formulation and the mixing amounts.

Experimental Examples 2 to 8

A base material for a membrane filter was obtained by the same process as in Experimental Example 1 except that formulation was performed such that the average particle size of the alumina raw material was 33 μm, 35 μm, 37 μm, 40 μm, 43 μm, 45 μm, or 48 μm in each of Experimental Examples 2 to 8.

Experimental Example 9

A base material for a membrane filter was obtained by the same process as in Experimental Example 1 except that titania was not added and firing was performed in a hydrogen reduction atmosphere at 2,000° C. in Experimental Example 9.

Experimental Examples 10 to 13

A base material for a membrane filter was obtained by the same process as in Experimental Example 1 except that the purity of the alumina raw material was set to be 85% by mass, 80% by mass, 95% by mass, or 90% by mass in each of Experimental Examples 10 to 13.

Experimental Examples 14 to 17

A base material for a membrane filter was obtained by the same process as in Experimental Example 1 except that the average particle size of the titania raw material was set to be 0.005 μm, 2 μm, 0.01 μm %, or 1 μm in each of Experimental Examples 14 to 17.

Experimental Examples 18 to 23

A base material for a membrane filter was obtained by the same process as in Experimental Example 1 except that the addition amount of the titania raw material was set to be 0% by mass, 15% by mass, 0.1% by mass, 2% by mass, 5% by mass, or 10% by mass in each of Experimental Examples 18 to 23.

Experimental Examples 24 to 28

A base material for a membrane filter was obtained by the same process as in Experimental Example 1 except that the purity of the titania raw material was set to be 50% by mass, 60% by mass, 90% by mass, 80% by mass, or 70% by mass in each of Experimental Examples 24 to 28.

Experimental Examples 29 to 32

A base material for a membrane filter was obtained by the same process as in Experimental Example 1 except that the firing temperature was set to be 1,200° C., 1,300° C., 1,400° C., or 1,600° C. in each of Experimental Examples 29 to 32.

(Measurement of Pore Distribution)

The pore distribution was measured on each of the resulting base materials for a membrane filter. The pore distribution of each of the base materials was measured by a mercury porosimeter (AutoPore III 9400 manufactured by Shimadzu Corp).

(Measurement of Permeation Rate)

The permeation rate was measured on each of the resulting base materials for a membrane filter. The permeation rate was measured as follows. First, a sealing portion was arranged on the outlet side of the base material for a membrane filter so as to obtain a state in which one side of the cell was sealed. Next, by feeding distilled water from the inlet side into the cell, the flow rate, pressure, and water temperature of the feed water were measured. The measured values were converted to 25° C. under the pressing conditions of 0.1 MPa, and the volume of water ($m^3$) which had flowed (passed through the base material) per unit time and unit area was measured and defined as the permeation rate ($m^3/(m^2 \cdot h)$). The base material for a membrane filter having a permeation rate of 7.5 $m^3/(m^2 \cdot h)$ or more was evaluated to be good.

(Measurement of Internal Pressure Strength)

The internal pressure strength was measured on each of the resulting base materials for a membrane filter with a fabricated internal pressure strength measurement device (refer to FIG. 2). In the internal pressure strength measurement device, a water pressure test pump in which a pressure gauge with a maximum gauge pressure of 25 MPa and a hand pump were combined was used. First, by applying a latex to end faces of the base material for a membrane filter and inner faces of cells, water for measurement was prevented from leaking from the end faces and the side face of the base material, and cells at the end face opposite to the end face into which water was introduced. Furthermore, the base material for a membrane filter was fixed on the mounting unit in the state in which one end face side of the base material was blocked. The internal pressure strength was defined as a pressure at which the base material was broken when water pressure was applied to the inside of the base material for a membrane filter by the water pressure test pump. The base material for a membrane filter having an internal pressure strength of 0.6 MPa or more was evaluated to be good. Furthermore, after a corrosion test was carried out, the internal pressure strength was measured, and the corrosion resistance of the base material for a membrane filter was examined. In the corrosion test, the base material for a membrane filter was immersed in sulfuric acid (pH=1.3) and treated in an autoclave container at 200° C. for 3 hours, then washed with water, immersed in a NaOH solution (pH=13), and treated in an autoclave container at 200° C. for 3 hours. This cycle was performed twice. The internal pressure strength was measured on the base material for a membrane filter after having been subjected to the corrosion test. The base material for a membrane filter having an internal pressure strength of 0.5 MPa or more after the corrosion test was evaluated to be good.

(Results and Considerations)

Figure 3:
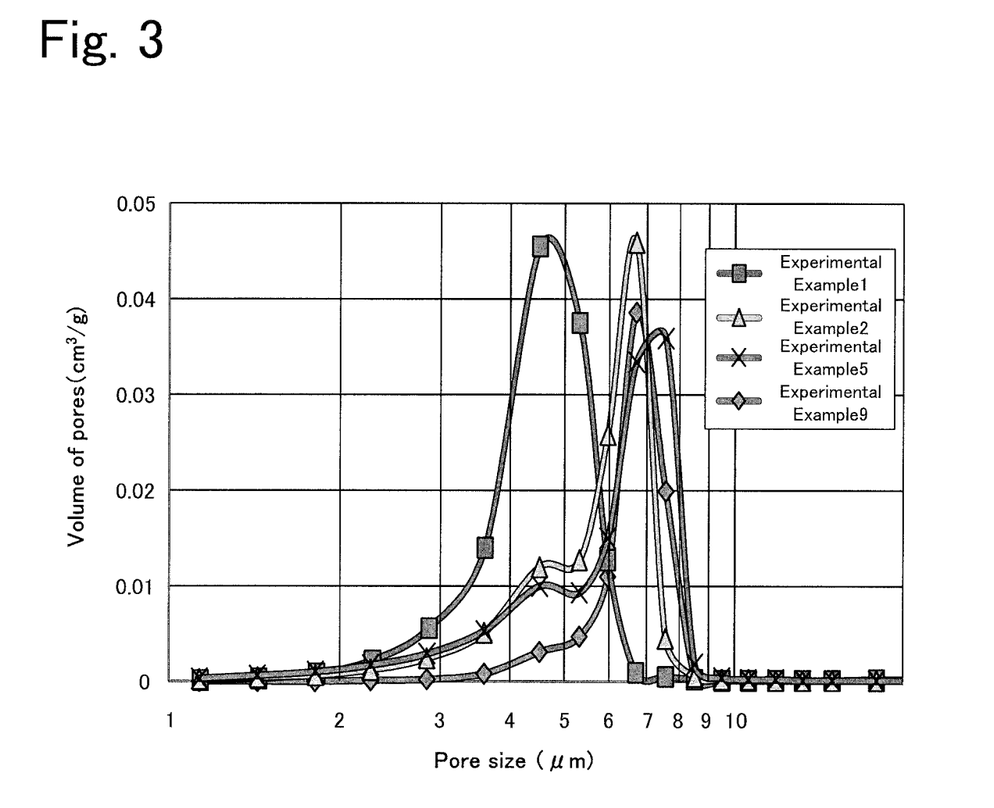
FIG. 3 shows pore distribution curves measured by a mercury porosimeter in Experimental Examples 1, 2, 5, and 9.

FIG. 3 shows pore distribution curves measured by a mercury porosimeter in Experimental Examples 1, 2, 5, and 9. Furthermore, Tables 1 to 6 summarize the production conditions and measurement results of characteristics in Experimental Examples 1 to 32. As shown in FIG. 3, in Experimental Example 1, in which the average particle size of the alumina raw material was small at 26 μm, one peak was located at a pore size of 4 to 5 μm. Furthermore, as the average particle size of the alumina raw material increased, the pore size of the peak tended to increase. In Experimental Example 2, in which the average particle size of the alumina raw material was 33 μm, a first peak was located at a pore size of 4 to 5 μm, and a second peak higher than the first peak was located at a pore size of 6 to 7 μm. However, in Experimental Example 2, the volume of pores with a pore size of more than 7 μm was very small at 0.005 cm$^3$/g or less. In Experimental Example 9, a peak was located at a pore size of 6 to 7 μm, and the volume of pores with a pore size of more than 7 μm was 0.02 cm$^3$/g or more. On the other hand, in Experimental Example 5, in which the average particle size of the alumina raw material was 40 μm, a first peak was located at a pore size of 4 to 5 μm, and a second peak higher than the first peak was located at a pore size of 7 to 8 μm. In Experimental Example 5, it was found that the volume of pores with a pore size of more than 7 μm was 0.02 cm$^3$/g or more. Although typical Experimental Examples only are perform firing in a hydrogen reduction atmosphere, at 2,000° C., which is undesirable in terms of the complicatedness of the production process and energy consumption. Furthermore, in Experimental Examples 1 and 2, in which the average particle size of the alumina raw material was small, although the internal pressure strength was high, the pore size was small as shown in FIG. 3, and the permeation rate was low. On the other hand, in Experimental Examples 3 to 7, in which the average particle size of the alumina raw material was 35 to 45 μm, the permeation rate was high at 7.5 m$^3$/(m$^2$·h) or more, the internal pressure strength was high at 0.6 MPa or more, and the internal pressure strength after the corrosion test was 0.5 MPa or more, indicating high corrosion resistance. Furthermore, in Experimental Example 8, in which the average particle size of the alumina raw material was 48 μm, although the permeation rate was high, sintering strength was not obtained, resulting in low internal pressure strength. Therefore, it has become evident that it is favorable that the average particle size of the alumina raw material is in a range of 35 to 45 μm.

TABLE 1

| | Conditions | | | | | | | Characteristics | | |
|---|---|---|---|---|---|---|---|---|---|---|
| | Alumina | | | Titania | | | | | | |
| | Average particle size μm | Addition amount Mass % | Purity Mass % | Average particle size μm | Addition amount Mass % | Purity Mass % | Firing temperature ° C. | Permeation rate m$^3$/m$^2$·h | Internal pressure strength MPa | Internal pressure strength after the corrosion test MPa |
| Experimental Example 1 | 26 | 99 | 99 | 0.2 | 1 | 99 | 1500 | 4.5 | 1.3 | 0.9 |
| Experimental Example 2 | 33 | 99 | 99 | 0.2 | 1 | 99 | 1500 | 6.0 | 1.0 | 0.8 |
| Experimental Example 3 | 35 | 99 | 99 | 0.2 | 1 | 99 | 1500 | 8.0 | 1.0 | 0.8 |
| Experimental Example 4 | 37 | 99 | 99 | 0.2 | 1 | 99 | 1500 | 8.0 | 1.0 | 0.8 |
| Experimental Example 5 | 40 | 99 | 99 | 0.2 | 1 | 99 | 1500 | 8.5 | 1.0 | 0.9 |
| Experimental Example 6 | 43 | 99 | 99 | 0.2 | 1 | 99 | 1500 | 9.5 | 0.8 | 0.7 |
| Experimental Example 7 | 45 | 99 | 99 | 0.2 | 1 | 99 | 1500 | 10 | 0.8 | 0.7 |
| Experimental Example 8 | 48 | 99 | 99 | 0.2 | 1 | 99 | 1500 | 11 | 0.5 | 0.4 |
| Experimental Example 9 | 26 | 100 | 99 | — | — | — | 2000 (Reduction) | 9.2 | 4.3 | 0.5 |

※Corrosion test conditions: Alternate immersion of sulfuric acid (pH 1.3)/NaOH (pH 13), 200° C. × 3 hr, 2 cycles in autoclave container shown in FIG. 3, Experimental Examples 3 to 7, 12 and 13, 16 and 17, 20 to 23, 26 to 28, 31 and 32, the same tendency was observed. From the pore distribution curves, it was estimated that Experimental Examples 5 and 9 would have a high permeation rate.

Table 1 shows the measurement results when the average particle size of the alumina raw material is changed. As shown in Table 1, in Experimental Example 9, although all of the permeation rate, internal pressure strength, and corrosion resistance had high values, it was necessary to Table 2 shows the measurement results when the purity of the alumina raw material is changed in Experimental Examples 5, and 10 to 13. Note that examples of impurities contained in alumina include oxides of Fe, Al, Si, Nb, and Na. As shown in Table 2, in Experimental Examples 10 and 11, in which the purity of the alumina raw material was 85% by mass or less, owing to dissolution of impurities and the like, corrosion resistance was low. Table 2 shows that as the purity of alumina increases, corrosion resistance increases, and it has become evident that preferably, the purity of alumina is higher.

TABLE 2

| | Conditions | | | | | | | Characteristics | | |
| --- | --- | --- | --- | --- | --- | --- | --- | --- | --- | --- |
| | Alumina | | | Titania | | | | | | |
| | Average particle size μm | Addition amount Mass % | Purity Mass % | Average particle size μm | Addition amount Mass % | Purity Mass % | Firing temperature ° C. | Permeation rate m³/m² · h | Internal pressure strength MPa | Internal pressure strength after the corrosion test MPa |
| Experimental Example10 | 40 | 99 | 85 | 0.2 | 1 | 99 | 1500 | 8.5 | 1.2 | 0.4 |
| Experimental Example11 | 40 | 99 | 80 | 0.2 | 1 | 99 | 1500 | 9.0 | 1.3 | 0.4 |
| Experimental Example5 | 40 | 99 | 99 | 0.2 | 1 | 99 | 1500 | 8.5 | 1.0 | 0.9 |
| Experimental Example12 | 40 | 99 | 95 | 0.2 | 1 | 99 | 1500 | 8.5 | 1.1 | 0.7 |
| Experimental Example13 | 40 | 99 | 90 | 0.2 | 1 | 99 | 1500 | 8.5 | 1.1 | 0.5 |

※Corrosion test conditions: Alternate immersion of sulfuric acid (pH 1.3)/NaOH (pH 13), 200° C. × 3 hr, 2 cycles in autoclave container Table 3 shows the measurement results when the average particle size of the titania raw material is changed in Experimental Examples 5, and 14 to 17. As shown in Table 3, in Experimental Example 14, in which the average particle size was 0.005 μm or less, corrosion resistance was low. Furthermore, in Experimental Example 15, in which the average particle size of the titania raw material was 2 μm or more, sinterability was insufficient, and the internal pressure strength was low before and after the corrosion test. On the other hand, in Experimental Examples 5, 16, and 17, in which the average particle size of the titania raw material was 0.01 to 1 μm, the permeation rate, the internal pressure strength, and the corrosion resistance were high. Therefore, it has become evident that preferably, the average particle size of the titania raw material is in a range of 0.01 to 1 μm.

Table 4 shows the measurement results when the addition amount of the titania raw material is changed in Experimental Examples 5, and 18 to 23. As shown in Table 4, in Experimental Example 18, in which the titania raw material was not added, sinterability was insufficient, and the internal pressure strength was low before and after the corrosion test. On the other hand, in Experimental Examples 5, and 20 to 23, in which 0.1% to 10% by mass of the titania raw material was added, the permeation rate, the internal pressure strength, and the corrosion resistance were high. Furthermore, in Experimental Example 19, in which 15% by mass of the titania raw material was added, since the amount of titania was large, and its strength was low, the internal pressure strength was low before and after the corrosion test. Therefore, it has become evident that preferably, the addition amount of the titania raw material is in a range of 0.1% to 10% by mass. It has also become evident that preferably, the mixing amount of the alumina raw material is 90% by mass or more.

TABLE 3

| | Conditions | | | | | | | Characteristics | | |
| --- | --- | --- | --- | --- | --- | --- | --- | --- | --- | --- |
| | Alumina | | | Titania | | | | | | |
| | Average particle size μm | Addition amount Mass % | Purity Mass % | Average particle size μm | Addition amount Mass % | Purity Mass % | Firing temperature ° C. | Permeation rate m³/m² · h | Internal pressure strength MPa | Internal pressure strength after the corrosion test MPa |
| Experimental Example14 | 40 | 99 | 99 | 0.005 | 1 | 99 | 1500 | 9.0 | 1.3 | 0.4 |
| Experimental Example15 | 40 | 99 | 99 | 2 | 1 | 99 | 1500 | 8.5 | 0.5 | 0.4 |
| Experimental Example5 | 40 | 99 | 99 | 0.2 | 1 | 99 | 1500 | 8.5 | 1.0 | 0.9 |
| Experimental Example16 | 40 | 99 | 99 | 0.01 | 1 | 99 | 1500 | 9.0 | 1.2 | 0.9 |
| Experimental Example17 | 40 | 99 | 99 | 1 | 1 | 99 | 1500 | 8.5 | 0.9 | 0.8 |

※Corrosion test conditions: Alternate immersion of sulfuric acid (pH 1.3)/NaOH (pH 13), 200° C. × 3 hr, 2 cycles in autoclave container

TABLE 4

| | Conditions | | | | | | | Characteristics | | |
| --- | --- | --- | --- | --- | --- | --- | --- | --- | --- | --- |
| | Alumina | | | Titania | | | | | | |
| | Average particle size μm | Addition amount Mass % | Purity Mass % | Average particle size μm | Addition amount Mass % | Purity Mass % | Firing temperature ° C. | Permeation rate m³/m² · h | Internal pressure strength MPa | Internal pressure strength after the corrosion test MPa |
| Experimental Example18 | 40 | 100 | 99 | 0.2 | 0 | 99 | 1500 | 7.5 | 0.4 | 0.2 |
| Experimental Example19 | 40 | 85 | 99 | 0.2 | 15 | 99 | 1500 | 7.5 | 0.3 | 0.2 |
| Experimental Example5 | 40 | 99 | 99 | 0.2 | 1 | 99 | 1500 | 8.5 | 1.0 | 0.9 |
| Experimental Example20 | 40 | 99.9 | 99 | 0.2 | 0.1 | 99 | 1500 | 8.0 | 0.8 | 0.6 |
| Experimental Example21 | 40 | 98 | 99 | 0.2 | 2 | 99 | 1500 | 8.5 | 1.0 | 0.9 |
| Experimental Example22 | 40 | 95 | 99 | 0.2 | 5 | 99 | 1500 | 8.0 | 0.8 | 0.6 |
| Experimental Example23 | 40 | 90 | 99 | 0.2 | 10 | 99 | 1500 | 8.0 | 0.6 | 0.5 |

※Corrosion test conditions: Alternate immersion of sulfuric acid (pH 1.3)/NaOH (pH 13), 200° C. × 3 hr, 2 cycles in autoclave container Table 5 shows the measurement results when the purity of the titania raw material is changed in Experimental Examples 5, and 24 to 28. Note that examples of impurities contained in titania include oxides of Fe, Na, and Al. As shown in Table 5, in Experimental Examples 24 and 25, in which the purity of the titania raw material was 60% by mass or less, although permeability and sinterability were sufficient, owing to dissolution of impurities and the like, the internal pressure strength after the corrosion test was low. On the other hand, in Experimental Examples 5, and 26 to 28, in which the purity of the titania raw material was 70% by mass or more, the permeation rate, internal pressure strength, and corrosion resistance were high. Table 5 shows that as the purity of titania increases, corrosion resistance increases, and it has become evident that preferably, the purity of titania is higher.

Table 6 shows the measurement results when the firing temperature is changed in Experimental Examples 5, and 29 to 32. The base composition, such as the composition ratio, in each of the experimental examples was set to be the same as that of Experimental Example 5. Furthermore, in an oxidizing atmosphere (in the air atmosphere), firing furnace members could not withstand a temperature exceeding 1,600° C., and therefore, firing was performed at 1,600° C. or lower. As shown in Table 6, in Experimental Examples 29 and 30, in which the firing temperature was 1,300° C. or lower, sintering was insufficient, and the internal pressure strength before and after the corrosion test was low. On the other hand, in Experimental Examples 5, 31, and 32, in which the firing temperature was 1,400° C. or higher, the permeation rate, internal pressure strength, and corrosion resistance were high. As is evident from Table 6, the firing temperature is preferably 1,400° C. to 1,600° C.

TABLE 5

| | Conditions | | | | | | | Characteristics | | |
| --- | --- | --- | --- | --- | --- | --- | --- | --- | --- | --- |
| | Alumina | | | Titania | | | | | | |
| | Average particle size μm | Addition amount Mass % | Purity Mass % | Average particle size μm | Addition amount Mass % | Purity Mass % | Firing temperature ° C. | Permeation rate m³/m² · h | Internal pressure strength MPa | Internal pressure strength after the corrosion test MPa |
| Experimental Example24 | 40 | 99 | 99 | 0.2 | 1 | 50 | 1500 | 9.0 | 1.4 | 0.4 |
| Experimental Example25 | 40 | 99 | 99 | 0.2 | 1 | 60 | 1500 | 8.5 | 1.3 | 0.4 |
| Experimental Example5 | 40 | 99 | 99 | 0.2 | 1 | 99 | 1500 | 8.5 | 1.0 | 0.9 |
| Experimental Example26 | 40 | 99 | 99 | 0.2 | 1 | 90 | 1500 | 8.5 | 1.0 | 0.8 |
| Experimental Example27 | 40 | 99 | 99 | 0.2 | 1 | 80 | 1500 | 8.5 | 1.1 | 0.6 |
| Experimental Example28 | 40 | 99 | 99 | 0.2 | 1 | 70 | 1500 | 8.5 | 1.2 | 0.5 |

※Corrosion test conditions: Alternate immersion of sulfuric acid (pH 1.3)/NaOH (pH 13), 200° C. × 3 hr, 2 cycles in autoclave container

TABLE 6

| | Conditions | | | | | | | Characteristics | | |
|---|---|---|---|---|---|---|---|---|---|---|
| | Alumina | | | Titania | | | | | | |
| | Average particle size μm | Addition amount Mass % | Purity Mass % | Average particle size μm | Addition amount Mass % | Purity Mass % | Firing temperature ° C. | Permeation rate m³/m² · h | Internal pressure strength MPa | Internal pressure strength after the corrosion test MPa |
| Experimental Example29 | 40 | 99 | 99 | 0.2 | 1 | 99 | 1200 | 7.5 | 0.4 | 0.3 |
| Experimental Example30 | 40 | 99 | 99 | 0.2 | 1 | 99 | 1300 | 7.5 | 0.5 | 0.4 |
| Experimental Example5 | 40 | 99 | 99 | 0.2 | 1 | 99 | 1500 | 8.5 | 1.0 | 0.9 |
| Experimental Example31 | 40 | 99 | 99 | 0.2 | 1 | 99 | 1400 | 8.5 | 0.8 | 0.6 |
| Experimental Example32 | 40 | 99 | 99 | 0.2 | 1 | 99 | 1600 | 9.0 | 1.2 | 1.0 |

※Corrosion test conditions: Alternate immersion of sulfuric acid (pH 1.3)/NaOH (pH 13), 200° C. × 3 hr, 2 cycles in autoclave container It is to be understood that the base material for a membrane filter according to the present disclosure is not limited to the examples described above, and various embodiments are possible within the technical scope of the base material for a membrane filter.

The present application claims priority from Japanese Patent Application No. 2018-067361 filed on Mar. 30, 2018, the entire contents of which are incorporated herein by reference.

What is claimed is:

1. A base material for a membrane filter comprising 90% by mass or more of aluminum oxide and 0.1% by mass or more and 10% by mass or less of titanium oxide,
   wherein, in a pore distribution curve measured by a mercury porosimeter, the base material has a first peak and a second peak which is higher than the first peak and is located at a pore size larger than that of the first peak, and the volume of pores with a pore size of 7 μm or more is 0.02 cm³/g or more.

2. The base material for a membrane filter according to claim 1, wherein the first peak is located at a pore size in a range of 4 μm to 6 μm, and the second peak is located at a pore size in a range of 6 μm in to 9 μm.

3. The base material for a membrane filter according to claim 1, wherein, in the pore distribution curve measured by the mercury porosimeter, the volume of pores of the first peak is in a range of 0.005 cm³/g to 0.02 cm³/g, and the volume of pores of the second peak is in a range of 0.03 cm³/g to 0.05 cm³/g.

4. The base material for a membrane filter according to claim 1, wherein the base material has a permeation rate of 7.5 m³/(m²·h) or more.

5. The base material for a membrane filter according to claim 1, wherein the base material has an internal pressure strength of 0.6 MPa or more.

6. A method for producing a base material for a membrane filter comprising:
   a mixing and forming step in which, using, as raw materials, aluminum oxide having an average particle size of 35 μm or more and 45 μm or less and a purity of 90% by mass or more and titanium oxide having an average particle size of 0.01 μm or more and 1 μm or less and a purity of 70% by mass or more, mixing is performed such that the amount of aluminum oxide is 90% by mass or more and the amount of titanium oxide is 0.1% by mass or more and 10% by mass or less based on the total of aluminum oxide and titanium oxide, and the resulting mixture is formed into a shaped body; and
   a firing step in which the shaped body is fired in an oxidizing atmosphere in a temperature range of 1,400° C. to 1,600° C.;
   wherein, in a pore distribution curve measured by a mercury porosimeter, the base material has a first peak and a second peaks which is higher than the first peak and is located at a pore size larger than that of the first peak, and the volume of pores with a pore size of 7 μm or more is 0.02 cm³/g or more.

7. The method for producing a base material for a membrane filter according to claim 6, wherein, in the mixing and forming step, the average particle size of the aluminum oxide is adjusted to 35 μm or more and 45 μm or less by mixing aluminum oxide powders with an average particle size of 0.5 μm or more and 50 μm or less.

8. The method for producing a base material for a membrane filter according to claim 6, wherein, in the mixing and forming step, one or more raw materials selected from the group consisting of (1) to (5) are used:
   (1) aluminum oxide having an average particle size of 37 μm or more and 43 μm or less,
   (2) aluminum oxide having a purity of 95% by mass or more and 99.9% by mass or less,
   (3) titanium oxide having a purity of 85% by mass or more and 99.9% by mass or less,
   (4) titanium oxide mixed in an amount of 0.1% by mass or more and 2% by mass or less, and
   (5) aluminum oxide in an amount of 98% by mass or more and 99.9% by mass or less.

9. The method for producing a base material for a membrane filter according to claim 6, wherein, in the mixing and forming step, the mixture is formed into one or more shapes selected from the group consisting of (6) to (8):
   (6) a shape with a diameter of 30 mm or more, a length of 100 mm or more, and 19 or more cells,
   (7) a shape with a diameter of 90 mm or more, a length of 100 mm or more, and 300 or more cells, and
   (8) a shape with a diameter of 180 mm or more, a length of 500 mm or more, and 2,000 or more cells.

* * * * *